Aug. 11, 1970     C. O. SCHARTZ     3,523,695
WHEEL SWIVEL MEANS
Filed April 19, 1968     2 Sheets-Sheet 1
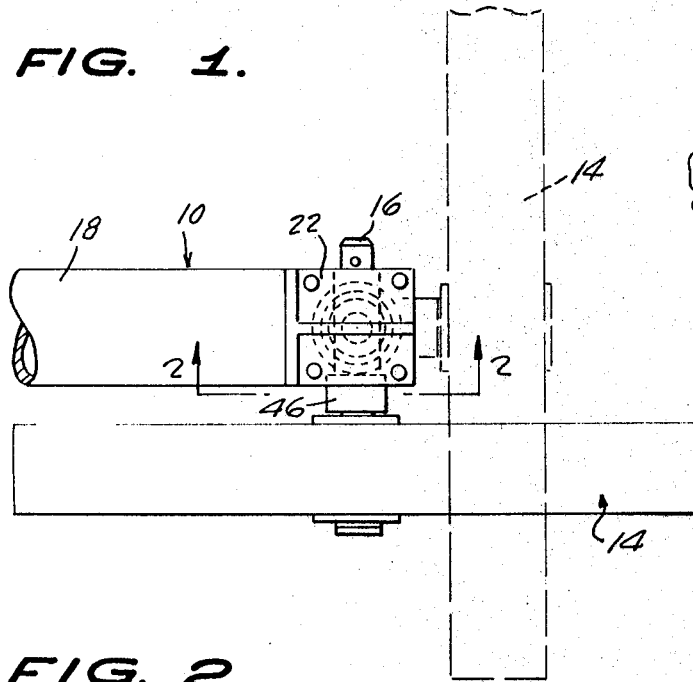
FIG. 1.
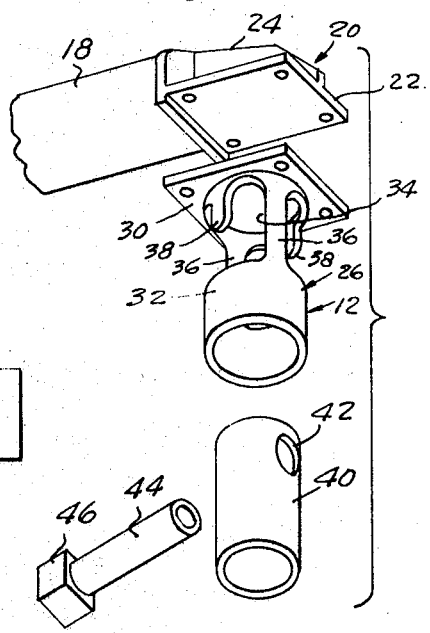
FIG. 5.
FIG. 2.
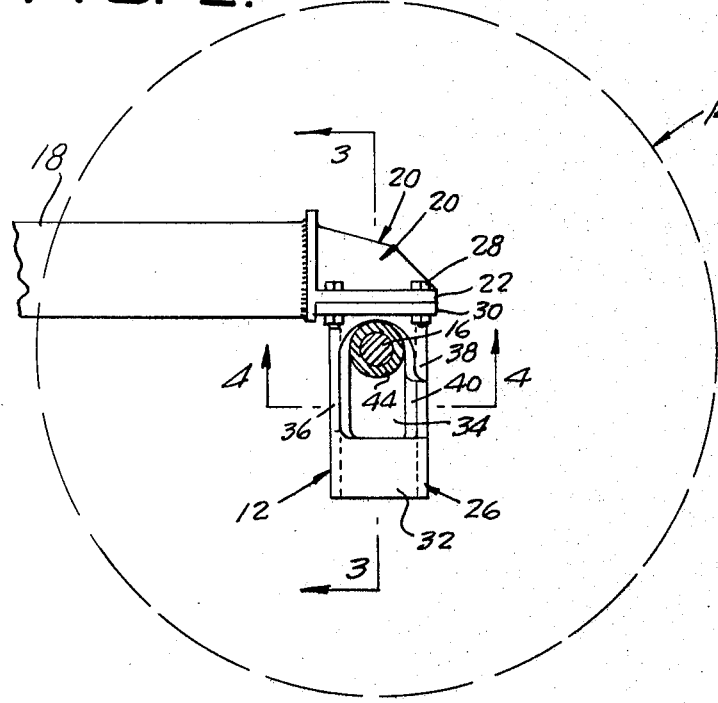
FIG. 3.
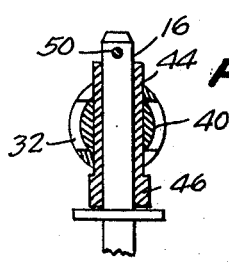
FIG. 4.
INVENTOR.
CHARLES OMAR SCHARTZ,
BY
Berman, Davidson & Berman
ATTORNEYS.

Aug. 11, 1970 C. O. SCHARTZ 3,523,695
WHEEL SWIVEL MEANS
Filed April 19, 1968 2 Sheets-Sheet 2
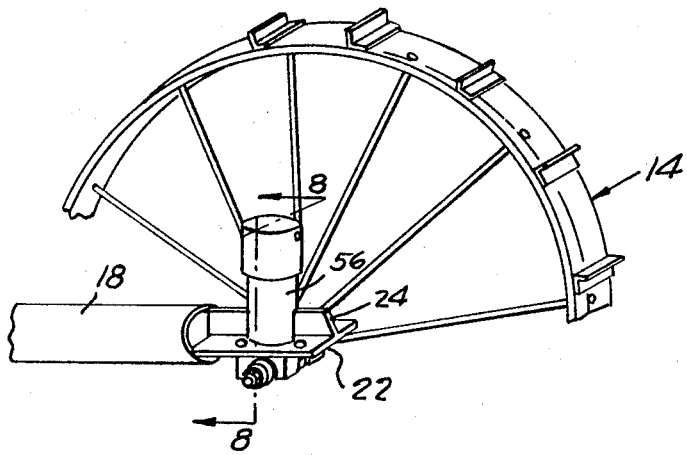
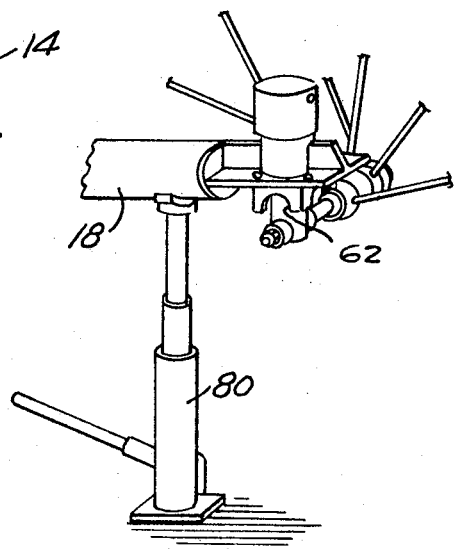
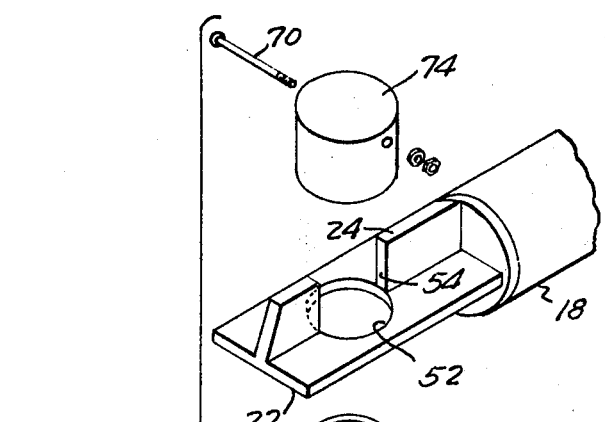
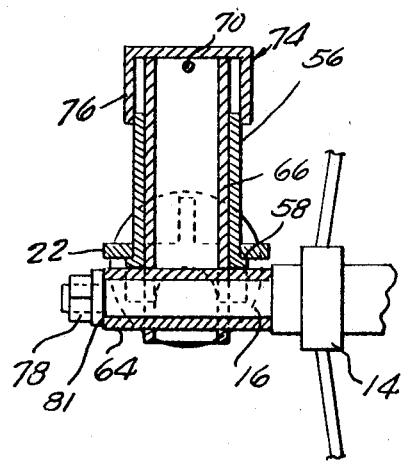
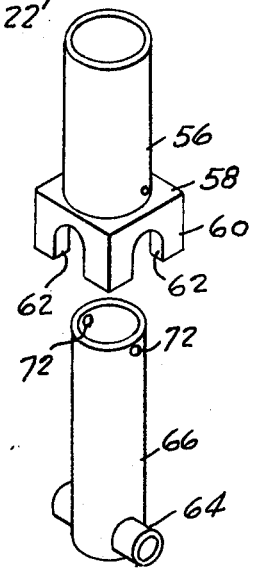
INVENTOR.
CHARLES OMAR SCHARTZ,
BY
Berman, Davidson & Berman
ATTORNEYS.

United States Patent Office 3,523,695
Patented Aug. 11, 1970

3,523,695
WHEEL SWIVEL MEANS
Charles Omar Schartz, RR 2, Box 76,
Larned, Kans. 67550
Filed Apr. 19, 1968, Ser. No. 722,794
Int. Cl. B62d *61/00*
U.S. Cl. 280—80                                7 Claims

ABSTRACT OF THE DISCLOSURE

An apparatus comprising means for rotating or swivelling the wheel and its axle about a vertical post that is fixedly connected to a frame without detachably releasing the wheel and axle from connection with the frame by providing a swivel body that is connected to a saddle assembly so that the swivel body and the saddle assembly are slidable relative to each other so that the frame to which the saddle assembly is secured can be raised with respect to the swivel body in order to permit the swivel body and the wheel and axle attached thereto to be turned or rotated through approximately 90°.

---

The present invention provides a wheel swivel for a self-propelled irrigation system and the like which system is designed so that the system not only travels a circular path around a field while irrigating, but is also movable from one field to another.

It is an object of the present invention to provide a wheel swivel for a self-propelled irrigation system so that the wheels in the system which are usually connected to axle housings bolted to the irrigation system frame can be rotated or turned with respect to the frame through an arc which permits the irrigation apparatus to be moved in a straight line path, as well as the circular path around a field in which position it is disposed during irrigation.

It is yet another object of the present invention to provide a wheel swivel unit for use with an irrigation apparatus in which the frame of the apparatus can be jacked up or raised with respect to the individual wheels and the wheels rotated or turned from their irrigating position to a position for moving the apparatus from one field to another, without completely detaching the wheels from the frame.

It is yet another object of the present invention to provide a wheel swivel unit for an irrigating apparatus and the like in which the wheel is provided with a swivel body means that has a sleeve that can be turned or rotated about a vertical axis after the frame to which it is connected has been raised, so that the sleeve and the wheel and axle attached thereto are never disengaged from the frame and prevent any injury to personnel should the frame fall off of the jacking apparatus.

Still another object of the present invention is to provide a simple rigid structural means for permitting a wheel to be rotated or turned from an irrigating position to a straight line so that the apparatus can be quickly moved from one field to another and quickly disposed in an irrigating position without requiring unnecessary complete connections and disconnections of the apparatus, as commonly required heretofore.

Another object of the present invention is to provide an axle and wheel that is never detached from the frame with which it is normally used, but which wheel can be readily swivelled or turned or rotated through an arc of approximately 90° after the frame is jacked or raised so that it eliminates the usual time consumming and dangerous job required heretofore when the wheel and its axle with an accumulation of mud that could weight considerably more than 100 pounds had to be completely dismanted from the frame and thereafter turned and then assembled back on the frame.

Still another object of the present invention is to provide a wheel swivel assembly that can be quickly rotated from a position in which the irrigating apparatus travels in a circular path around a field, to a position in which the apparatus can be moved from one field to another, and in which the wheel and axle is never completely disengaged from the frame so that due to the wet condition of the ground, should the jacking apparatus slip from beneath the frame and allow the frame to fall, the wheel and axle will always support the frame and thus eliminate any injury to the operator underneath the apparatus or any damage to the system.

Various other objects and advantages of the present invention will be readily apparent from the following detailed description when considered in connection with the accompanying drawings forming a part thereof and in which:

FIG. 1 is a plan view of the wheel swivel unit embodying the present invention;
FIG. 2 is a side elevational view looking in the direction of the line 2—2 of FIG. 1;
FIG. 3 is a section taken along the lines 3—3 of FIG. 2;
FIG. 4 is a section taken along the lines 4—4 of FIG. 2;
FIG. 5 is an exploded view of the wheel swivel means embodied in the present invention;
FIG. 6 is a perspective view of a modification of the invention illustrated in FIGS. 1 to 5;
FIG. 7 is a view illustrating the wheel swivel means of FIG. 6 shown in a raised or jacked up position;
FIG. 8 is an enlarged sectional view taken along the lines 8—8 of FIG. 6; and
FIG. 9 is an exploded view of the parts of the wheel swivel means illustrated in FIG. 6.

Referring to the drawings, the reference numeral 10 generally designates a self-propelled irrigation apparatus provided with a wheel swivel assembly 12 and a wheel 14 having a stub axle 16.

Referring to FIG. 2, the irrigation apparatus is provided with a frame including a substantially horizontally extending tubular member 18 to which is secured, by welding or other suitable means, an L-channel member 20 having a horizontal bottom leg 22 with a vertical reinforcement web 24. The apparatus may have any number of tubular frame members 18 and channel members 20 welded thereto at any desired locations for attachment of any number of wheels 14 thereto.

A saddle assembly 26 is secured to the frame 18 by a plurality of bolts 28 secured to the bottom leg 22. The saddle assembly is provided with an upper substantially square flat plate 30 from which depends a cylindrical member or outer sleeve 32 that is cut away as indicated at 34 adjacent its upper portion. The upper portion is provided with two oppositely disposed straps or struts 36 and has two depending lugs or ears 38 disposed opposite each other and spaced approximately 90° from the struts 36. The lower end of the cylindrical member 32 is open and a cylindrical swivel body or sleeve 40 is disposed within the cylindrical member 32, as best seen in FIG. 3. The swivel body 40 is adapted to turn or rotate with respect to the outer cylindrical member 32 and is slidable in a vertical direction relative to the cylindrical member 32. The swivel body 40 is open at its opposite ends and is provided with aligned openings 42 in the upper end thereof to receive a hollow sleeve bearing 44 having a collar 46 on one end.

Referring to FIG. 3, it will be noted that the bearing 44 receives a stub axle 16 on which the wheel 14 is secured by any suitable well known means. A pin 50 is threaded through the outer end of the stud axle 16.

Referring to FIG. 1, the wheel 14 is shown in its irrigating position in full line, and the dotted line illustrates the wheel turned 90° or in its transport position. When it is desired to move the wheel or swivel it from its irrigating position a jack is placed under the tubular member 18 adjacent the wheel 14 and the tubular member 18 is jacked up or raised so that the swivel body or sleeve 40 and the stub 16 and the wheel disposed on the axle remain on the ground as the cylindrical member 32 is raised relative thereto, or moves vertically upwardly. As the member 18 and the cylindrical member 32 are jacked up the first 2 inches or so the bearing 44 will gradually be positioned below the lower ends of the ears or lugs 38 and will eventually rest on the upper edge of the lower portion of the cylindrical member 32 on the surface formed by the cut away portion 34. If the member 18 is raised up about an inch more, the wheel will be free from the ground and it can be easily rotated or turned from the irrigating position to the position indicated in dotted lines in FIG. 1 or to its transport position.

It will be noted that the wheel 14 is never disengaged or detached during this swivel operation and in the event that the jack should slip or the irrigating apparatus should roll ahead allowing the jack to fall from the member 18, the swivel assembly will stop the fall and there can be no injury to the operator or the member 18 can never fall to the ground.

After the wheel has been rotated or swivelled to its transport position 14, the jack is lowered and the tubular member 18 and the cylindrical member 32 will be moved toward the ground and the sleeve 44 will be in the position desired between the lugs 38 and the struts 36 and rotated or moved 90° from their first position.

Referring to the embodiment of the invention shown in FIGS. 6 to 9, it will be noted that the channel leg 22 of the tubular member 18 has its bottom leg 22 provided with an opening 52 therein and that the vertical web 24 is slotted as indicated at 54. A cylindrical saddle member 56 extends through the opening 52 and has a box collar 58 on the lower end thereof. The saddle member is secured to the bottom of the leg 22 by welding or other suitable means so that the box collar 58 extends below the leg 22. It will be noted that the box collar 58 is provided with four depending skirts or sides 60 each with a central slot 62 therein. The slot or notches 62 in opposite sides are disposed in alignment with each other so that a sleeve bearing 64 on the lower end of a swivel body 66 is received in two oppositely disposed notches 62. The swivel body or sleeve 66 is substantially longer than the saddle member 56 and extends therethrough. The upper end of the swivel body 66 is provided with oppositely disposed aligned holes 72 which receive a pin 70 therethrough which pin is threaded through oppositely aligned holes in a cap 74. The cap 74 has its depending wall 76 spaced from the outer surface of the swivel body 66 and adjacent the outer surface of the saddle member 56, as best seen in FIG. 8.

The stub axle 16 of the wheel 14 extends through the sleeve bearing 64 and has a nut 78 threaded on the end thereof.

The swivel body 66 is inserted from the bottom up into the saddle member 56, as best seen in FIG. 8, and the cap 74 is slipped over the saddle member 56, as well as over the swivel body 66.

When the wheel 14 is in an irrigating position, as shown in FIG. 6, it will be noted that the wheel is parallel to the axis of the tubular member 18 at which time the stub axle 16 and the sleeve bearing 64 are substantially perpendicular to the axis of the tubular member 18. At this time the nut 78 is in a tightened position upon the washer 81 and the wheel and axle are in a secure position.

When the tubular member 18 is jacked up by the jack 80, the saddle member 56 is raised as it is fixedly secured to the tubular member 18. The saddle member 56 as it is raised slides upwardly with respect to the swivel body 66 and into the cap 74. This releases the sleeve bearing 64 from the notches 62, or in other words enables the sleeve bearing 64 to clear the lower end of the opposite walls 60. The saddle member 56 as it is raised, contacts the bolt or pin 70 as the tubular member 18 and as the saddle member 56 secured thereto are raised a little higher yet, it will enable the swivel body 66 and the wheel 14 to be raised off the ground. Thereafter the wheel 14 and the swivel body 66 can be easily rotated or pivoted at 90° into a transport position. Thereafter when the sleeve bearing 64 has been aligned in a vertical direction with the notches 62 in its new position, 90° away from its initial position, the tubular member 18 and the saddles member 56 are lowered by moving the jack down, and thus the wheel is now disposed in its new transport position.

It will be noted that in this structure, the wheel and the axle are never removed from the saddle member during the moving operation so that should the jack slip, the saddle member will not fall to the ground and no injury will be caused to the operator or the system will not be damaged.

Furthermore, the wheel and the axle are clear of the ground so that they can be easily turned or pivoted by the operator and there is no need for exerting an excessive force to rotate the wheel and axle to its desired position. It is also apparent that since the wheel and the axle do not have to be completely dismantled from the saddle member, that the moving of the wheel and axle is much safer and easier and decreases substantially the moving time by as much as ¾, as compared with the dismantling time required heretofore.

Various changes may be made in the relative location and arrangement of the parts without departing from the spirit of the invention.

What is claimed is:

1. The combination of a frame for an irrigation vehicle and the like and a wheel swivel assembly, said wheel swivel assembly including a saddle member having a cylindrical outer sleeve secured to said frame, a swivel member being a cylindrical inner sleeve carried by said saddle member, and a wheel and axle member carried by said swivel member, said swivel member being disposed within said saddle member for axial slidable movement with respect thereto when said saddle member is vertically lifted or lowered, said wheel and axle member having a wheel axle passing through a sleeve bearing disposed in oppositely disposed aligned notches in said saddle member.

2. The combination of claim 1 wherein said saddle member is provided with depending lug means forming said notches spaced substantially 90° from each other.

3. The combination of claim 1 wherein said saddle member comprises a substantially vertical sleeve with a lower cylindrical section and a cut away upper section forming an upper opening therein with two oppositely disposed vertical struts extending across said opening and two oppositely disposed vertical lugs extending into said opening forming notches therebetween spaced 90° apart circumferentially of said opening.

4. The combination of claim 3 wherein said struts and lugs are disposed to provide oppositely disposed notches in alignment with the longitudinal axis of said frame and in alignment transversely of said frame.

5. The combination of claim 1 wherein said saddle member sleeve is substantially vertical and has a lower box member fixed to said frame, said box member has four depending walls with a central notch in each wall defining said oppositely disposed aligned notches, and said sleeve bearing being secured to the lower end of said swivel member, said swivel member being substantially longer than said outer sleeve of the saddle member and extending above it, and a cap being secured to the upper end of said swivel member inner sleeve by a bolt which extends through the cap and swivel member inner sleeve.

6. The combination of claim 5 wherein said central notches are disposed in alignment with the longitudinal axis of said frame and in alignment with the transverse axis of said frame.

7. The combination of claim 5 wherein said cap has a depending skirt which extends downwardly adjacent the outer surface of said swivel sleeve outer surface.

References Cited

UNITED STATES PATENTS

| | | |
|---|---|---|
| 1,855,459 | 4/1932 | Strandlund. |
| 2,401,881 | 6/1046 | Petsche _____ 16—35 |
| 2,657,938 | 11/1953 | Browne et al. _____ 16—35 X |
| 2,750,197 | 6/1956 | Tripp _____ 280—80 X |
| 2,851,939 | 9/1958 | Whisenant _____ 172—383 |
| 2,860,007 | 11/1958 | Cornelius _____ 16—35 X |
| 3,085,285 | 4/1963 | Morlik _____ 16—35 |
| 3,139,288 | 6/1964 | Peterson _____ 280—34 |

KENNETH H. BETTS, Primary Examiner